(12) United States Patent
Yoshida et al.

(10) Patent No.: US 7,751,555 B2
(45) Date of Patent: Jul. 6, 2010

(54) ANGLE VARIABLE MECHANISM AND DESKTOP APPARATUS

(75) Inventors: Shinichi Yoshida, Hachioji (JP); Akira Sugiyama, Suginami-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 124 days.

(21) Appl. No.: 12/200,484

(22) Filed: Aug. 28, 2008

(65) Prior Publication Data

US 2009/0161862 A1    Jun. 25, 2009

(30) Foreign Application Priority Data

Dec. 21, 2007   (JP) ............................. 2007-331142

(51) Int. Cl.
*H04M 1/00* (2006.01)
*H04M 9/00* (2006.01)
(52) U.S. Cl. .................. 379/436; 379/445; 379/446
(58) Field of Classification Search ..................
379/428.01–428.04, 436, 441, 445–447,
379/454; 248/126, 133, 685, 688
See application file for complete search history.

(56) References Cited

U.S. PATENT DOCUMENTS 6,215,869 B1    4/2001   Frank et al.
6,781,821 B2    8/2004   Tsubai
7,104,516 B2    9/2006   Uto et al.

FOREIGN PATENT DOCUMENTS

| EP | 1985910 | 10/2008 |
|---|---|---|
| GB | 2330477 | 1/1998 |
| JP | 2000-124620 | 4/2000 |
| JP | 2003-087382 | 3/2003 |
| JP | 2003-130036 | 5/2003 |

OTHER PUBLICATIONS

United Kingdom Application No. GB0816487.3 combined search and examination report under sections 17 and 18 (3), mailed Dec. 31, 2008.

*Primary Examiner*—Tuan D Nguyen
(74) *Attorney, Agent, or Firm*—Blakely, Sokoloff, Taylor & Zafman LLP

(57) ABSTRACT

According to one embodiment, an angle variable mechanism includes: a fixed unit that has guide surfaces and coaxial shaft portions; a movable unit that includes an outer surface, a concave portion having side surfaces, guide grooves, and notches; and a lock member that is swingably supported with the fixed unit and interposed between the side surfaces. The lock member has convex portions. The convex portions are slidably fitted to the guide grooves through the notches. Each of the convex portions has end portions. A length of the convex portion between the end portions is larger than an opening width of each of the notches. The end portion is formed thinner than another end portion, so that a gap is formed between the end portion and an inner surface of the guide groove.

16 Claims, 14 Drawing Sheets

ANGLE VARIABLE MECHANISM AND DESKTOP APPARATUS

CROSS-REFERENCE TO RELATED APPLICATIONS

This application is based upon and claims the benefit of priority from Japanese Patent Application No. 2007-331142, filed on Dec. 21, 2007, the entire contents of which are incorporated herein by reference.

BACKGROUND

1. Field

One embodiment of the invention relates to an angle variable mechanism varying a swing angle of a movable unit with respect to a fixed unit. In addition, the embodiment relates to a desktop apparatus such as a telephone in which an apparatus body having a handset and a display portion is swingably attached to a base placed on a desk, and more particularly, to a structure for varying a swing angle of an apparatus body with respect to a base.

2. Description of the Related Art

As a telephone apparatus normally used in an office, a home, or the like, there has been known an apparatus including a telephone body placed on a desktop and an angle variable apparatus that varies an installation angle of the telephone body.

For example, as disclosed in U.S. Pat. No. 7,104,516, a conventional angle variable apparatus having a tilt base, a tilt cover, and tilt arm. The tilt base is placed on a desk, and a cover bearing portion is formed at a front end portion of the tilt base. The cover bearing portion extends in a widthwise direction of the tilt base. A pair of engagement holes are formed at both ends of the cover bearing portion. The engagement hole includes a cylindrical hole portion and a fitting hole located above the cylindrical hole portion. The fitting hole has a slit shape having two opening edge portions parallel to each other.

A plurality of fixed concave portions are formed on an upper surface of the tilt base. The fixed concave portions are arranged with an interval in a depthwise direction of the tilt base.

The tilt cover is attached to a bottom surface of the telephone body. A cover swing shaft is formed at one end of the tilt cover. The cover swing shaft extends in a widthwise direction of the tilt cover. Cylindrical engagement portions are coaxially formed at both ends of the cover swing shaft. The engagement portion has two flat surfaces notched parallel to each other on an outer peripheral surface thereof.

The engagement portion of the cover swing shaft is inserted into the cylindrical hole portion through the fitting hole of the engagement hole. The cover swing shaft is swung in a shaft peripheral direction with the engagement portion inserted into the cylindrical hole portion, thereby tilting the flat surface of the engagement portion with respect to the opening edge portion of the fitting hole. Thus, the engagement portion of the cover swing shaft is retained and held to the cylindrical hole portion of the cover bearing portion, and the cover swing shaft of the tilt cover is swingably connected to the cover bearing portion of the tilt base.

The tilt arm is located between the tilt base and the tilt cover. One end of the tilt arm is swingably connected to the other end of the tilt cover. The connection portion of the tilt arm and the tilt cover employs the same configuration as the connection portion of the tilt base and the tilt cover. The other end of the tilt arm is hung in any one fixed concave portion of the tilt base. A tilt angle of the tilt cover with respect to the tilt base is varied by selecting the fixed concave portion in which the other end of the tilt arm is hung.

Therefore, it is possible to adjust the installation angle of the telephone body in a stepwise fashion according to operator's preference, thereby improving operability of the telephone body.

In the conventional angle variable apparatus for a telephone, an opening shape of the engagement hole of the tilt base and a shape of the engagement portion of the tilt cover have been studied so that the engagement portion of the tilt cover hardly comes off from the engagement portion of the tilt base.

However, for example, when the angle variable apparatus inadvertently falls down to receive a large impact, a relative positional relation between the tilt cover and the tilt base may be changed so that the flat surface of the engagement portion of the tilt cover is parallel to the opening edge portion of the fitting hole of the tilt base.

As a result, the engagement portion of the tilt cover comes off from the engagement hole of the tilt base and thus the function of the angle variable apparatus may be impaired.

Particularly, in the conventional variable apparatus, the shapes of the engagement portion of the tilt cover and the engagement hole of the tilt base are complex so that the tilt cover hardly comes off from the tilt base through normal use.

For this reason, once when the engagement portion of the tilt cover inadvertently comes off from the engagement hole of the tilt base, it takes a lot of time and effort for a person who does not know very much about the structure of the angle variable apparatus because the person has no idea how to attach the engagement portion into the engagement hole.

SUMMARY

One of objects of the invention is to provide an angle variable mechanism capable of preventing a concave portion of a lock member from being detached from a guide groove, for example, even in case where the angle variable mechanism receives an impact.

According to one aspect of the invention, an angle variable mechanism includes: a fixed unit that has a pair of guide surfaces recessed in a circular arc shape and a pair of coaxial shaft portions located between the guide surfaces; a movable unit that includes an outer peripheral surface being curved in a circular arc shape and being in slidable contact with the pair of guide surfaces, a concave portion being opened in the outer peripheral surface and having a pair of side surfaces which face each other, a pair of guide grooves formed on the pair of side surfaces respectively and curved along the outer peripheral surfaces, to slidably receive the pair of shaft portions, and a pair of notches formed at respective edges between the pair of outer peripheral surfaces and the pair of side surfaces to guide the pair of shaft portions into the pair of guide grooves; and a lock member that is swingably supported with the fixed unit and interposed between the pair of side surfaces to regulate a swing angle of the movable unit with respect to the fixed unit, wherein the lock member has a pair of convex portions located on a swing center axis of the lock member, wherein the pair of convex portions are slidably fitted to the pair of guide grooves through the pair of notches respectively, wherein each of the convex portions has a first end portion and a second end portion separated from each other in a lengthwise direction of the guide grooves in a state where the pair of convex portions are received in the pair of guide grooves respectively, wherein a length of the convex portion between the first end portion and the second end portion is larger than an opening width of each of the notches in the lengthwise direction, wherein the second end portion is formed thinner than the first end portion, so that a gap is formed between the second end portion and an inner surface of the guide groove to allow the lock member to swing.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings.

Hereinafter, an embodiment of the invention will be described with reference to FIGS. 1 to 16.

Figure 1:
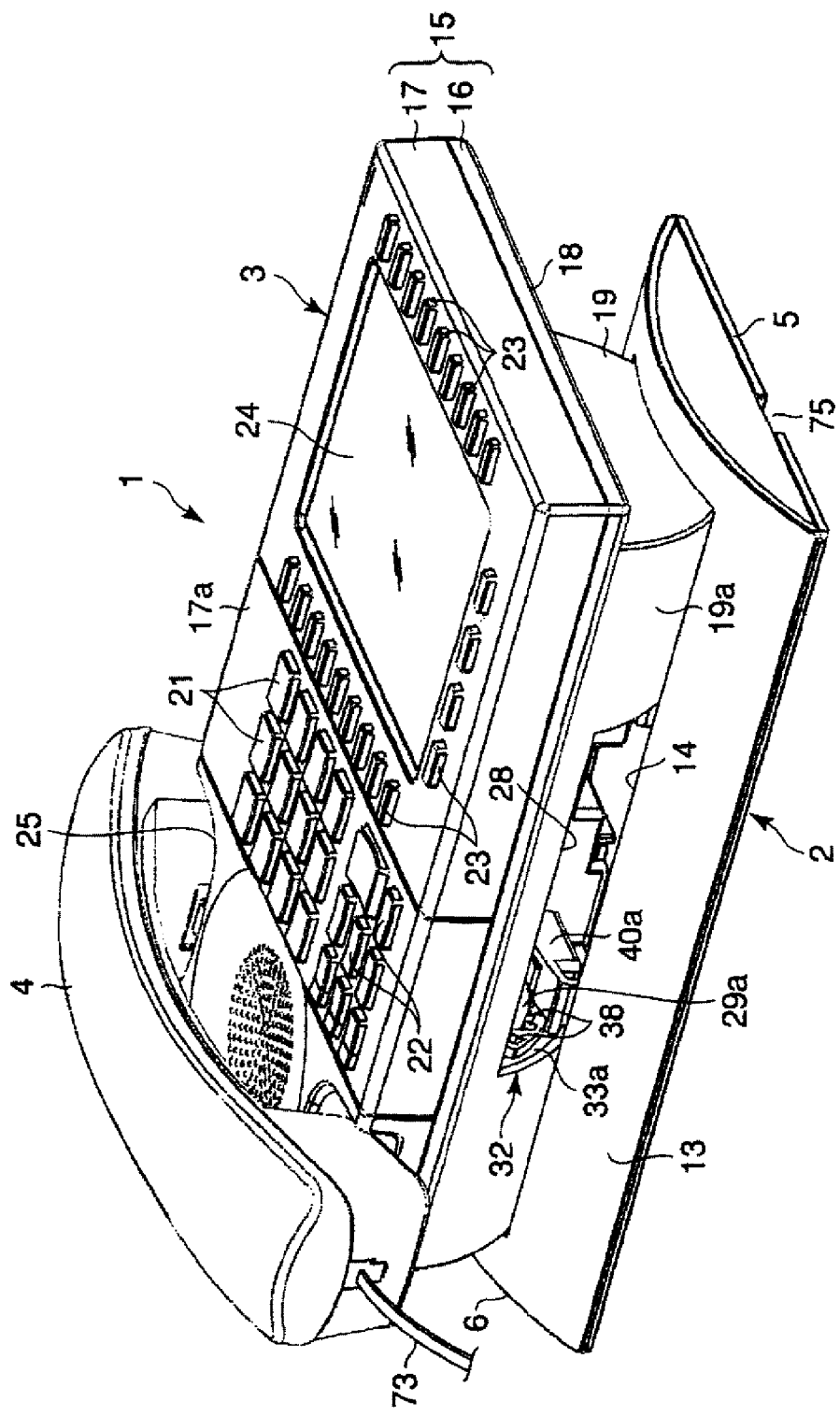
FIG. 1 is an exemplary perspective view showing a telephone according to an embodiment of the invention viewed from the front side.
Figure 2:
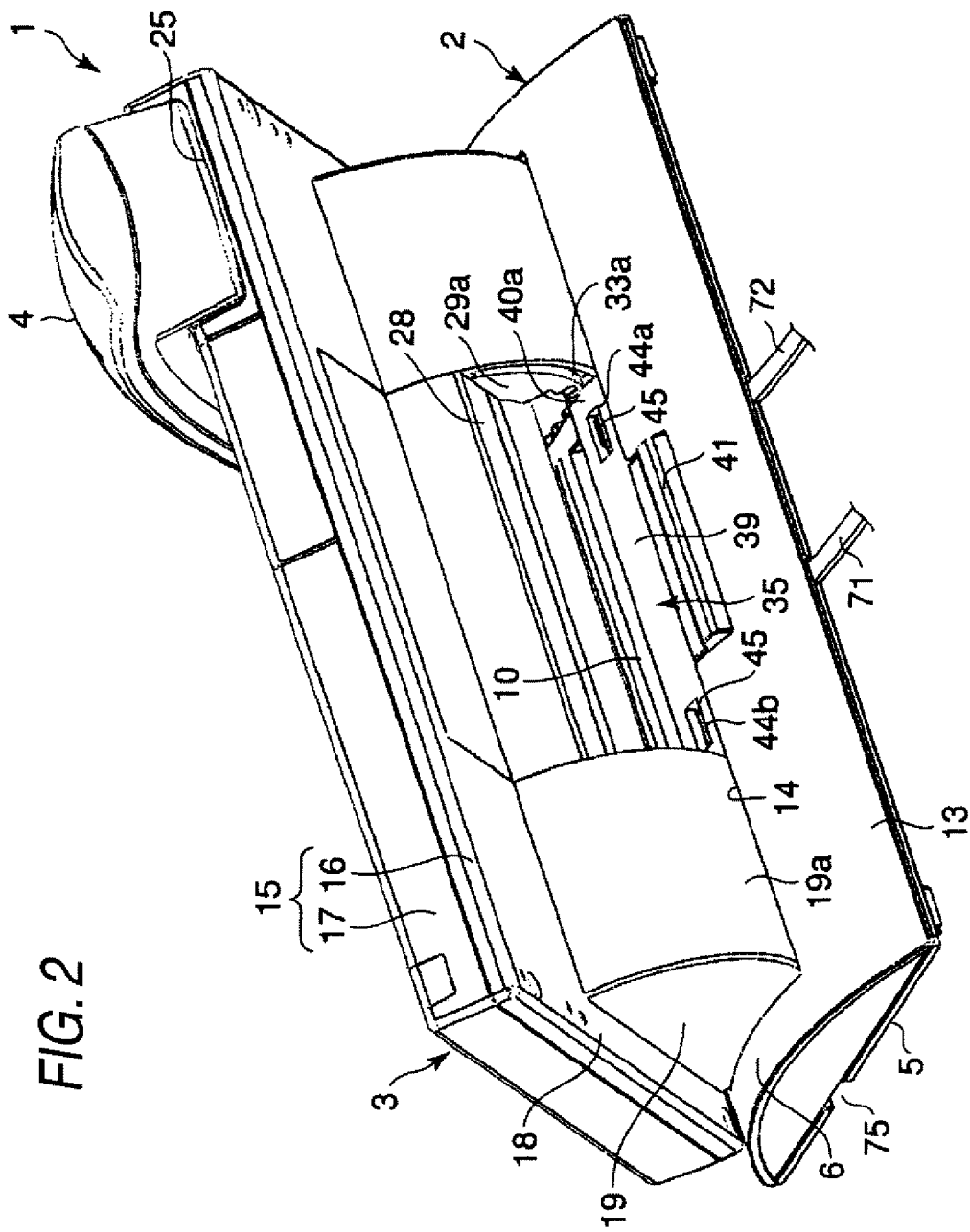
FIG. 2 is an exemplary perspective view showing a telephone according to the embodiment viewed from the rear side.

FIGS. 1 and 2 show a telephone 1 that is an example of a desktop apparatus. It is considered that the telephone 1 according to the embodiment is supposed to be normally used in an office, a home, or the like. The telephone 1 may be placed on the desk or hung up on the wall for use.

The telephone 1 includes a base 2, an apparatus body 3, and a handset 4. The base 2 is an example of a fixed unit placed on the desk, and includes a bottom plate 5 and a top cover 6.

Figure 3:
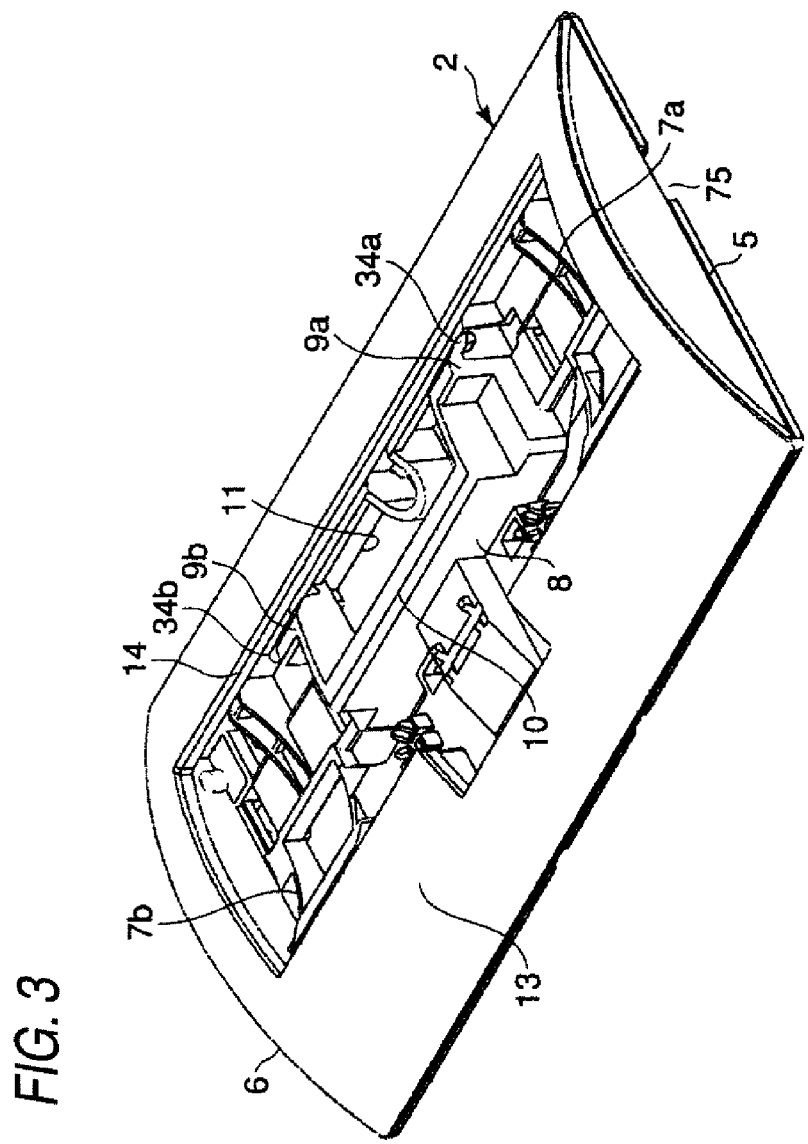
FIG. 3 is an exemplary perspective view showing a base as a fixed unit in the embodiment.

The bottom plate 5 has a rectangular plate shape. As shown in FIG. 3, a pair of guide surfaces 7a and 7b and a standing portion 8 are formed on an upper surface of the bottom plate 5. The guide surfaces 7a and 7b are formed at a right end portion and a left end portion of the base 2, and are curved to be recessed in a circular arc shape.

The standing portion 8 stands from the bottom plate 5 between the guide surfaces 7a and 7b. The standing portion 8 has left and right side walls 9a and 9b and a rear wall 10. The side walls 9a and 9b are separated from each other in a widthwise direction of the base 2 and extend in a depthwise direction of the base 2. The rear wall 10 extends in a widthwise direction of the base 2 between rear ends of the side walls 9a and 9b. A through-hole 11 is formed in an area surrounded by the side walls 9a and 9b and the rear wall 10 in the bottom plate 5.

The top cover 6 has an upper wall 13 covering an upper portion of the bottom plate 5. The upper wall 13 is curved in a circular arc shape convex upward. An opening portion 14 is formed at a center portion of the upper wall 13. The opening portion 14 has a rectangular shape extending in the widthwise direction of the base 2, and the guide surfaces 7a and 7b and the standing portion 8 are located inside the opening portion 14.

The apparatus body 3 is an example of a movable unit and is swingably supported with the base 2 in the range of a predetermined angle. The apparatus body 3 has a box-shaped case 15. The case 15 includes a bottom case 16 and a top cover 17.

Figure 4:
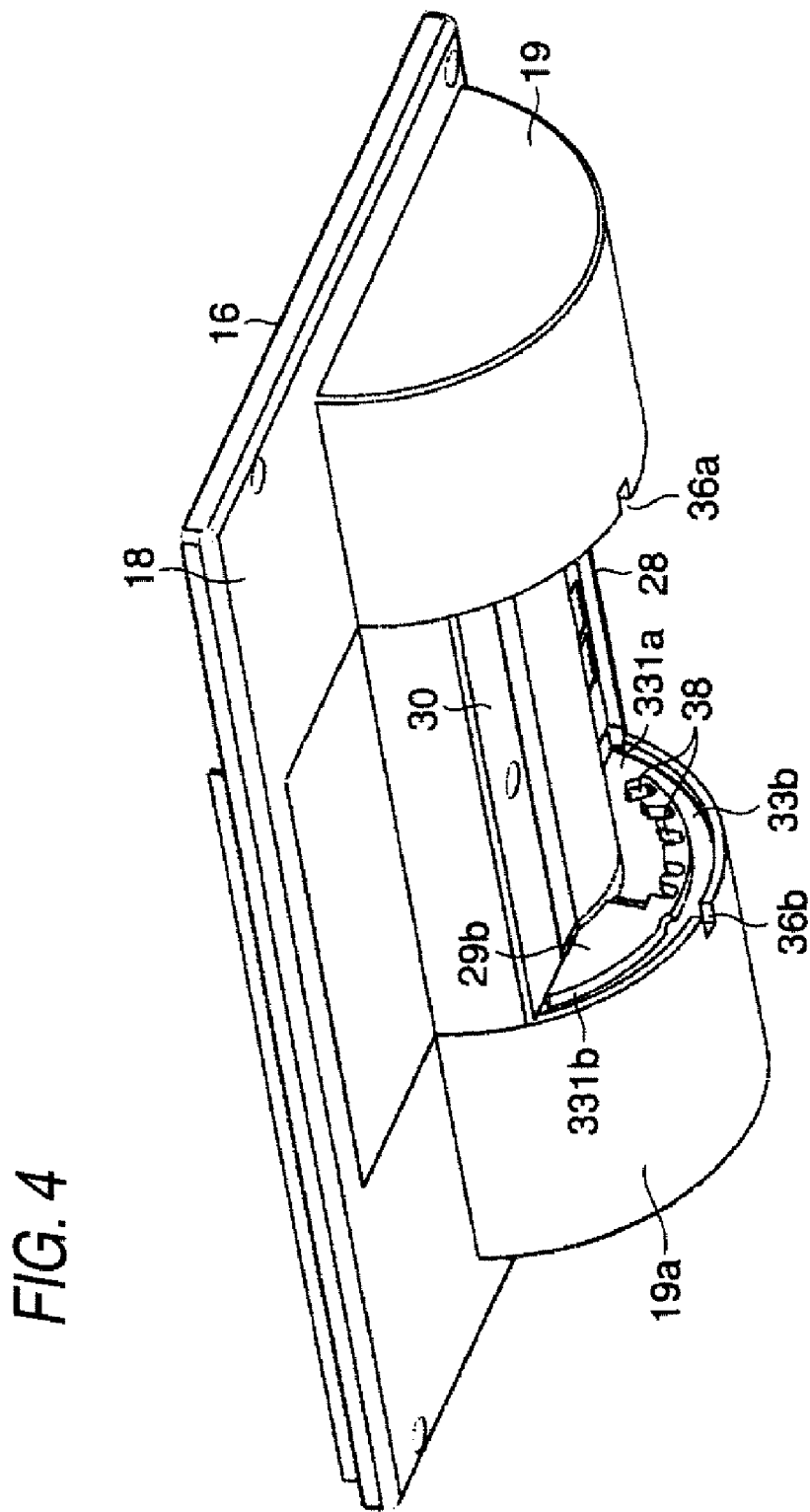
FIG. 4 is an exemplary perspective view showing a bottom case configuring a movable unit in the embodiment.

As shown in FIG. 4, the bottom case 16 has a rectangular bottom plate 18 and a leg portion 19 protruding downward from the bottom plate 18. The leg portion 19 has a semi-cylindrical shape extending in the widthwise direction of the apparatus body 3. For this reason, the leg portion 19 has an outer peripheral surface 19a curved downward in a circular arc shape. A curvature of the outer peripheral surface 19a of the leg portion 19 corresponds to a curvature of the guide surfaces 7a and 7b of the base 2.

The top cover 17 has a rectangular flat box shape opened toward the bottom case 16. The top cover 17 is coupled to an outer peripheral edge of the bottom plate 18 of the bottom case 16 and covers an upper portion of the bottom case 16.

The top cover 17 has a flat upper surface 17a serving as an apparatus operation surface. A plurality of dial buttons 21, a plurality of fixing function buttons 22, and a plurality of free assign buttons 23 are disposed on the upper surface 17a of the top cover 17.

A liquid crystal display portion 24 is disposed on the upper surface 17a of the top cover 17. The liquid crystal display portion 24 displays, for example, a phone number, a calendar, a time, a calling/receiving status, and contents individually assigned to the free assign buttons 23.

A handset placing portion 25 is formed at a left end portion on the upper surface 17a of the top cover 17. The handset 4 is placed on the handset placing portion 25.

Figure 5:
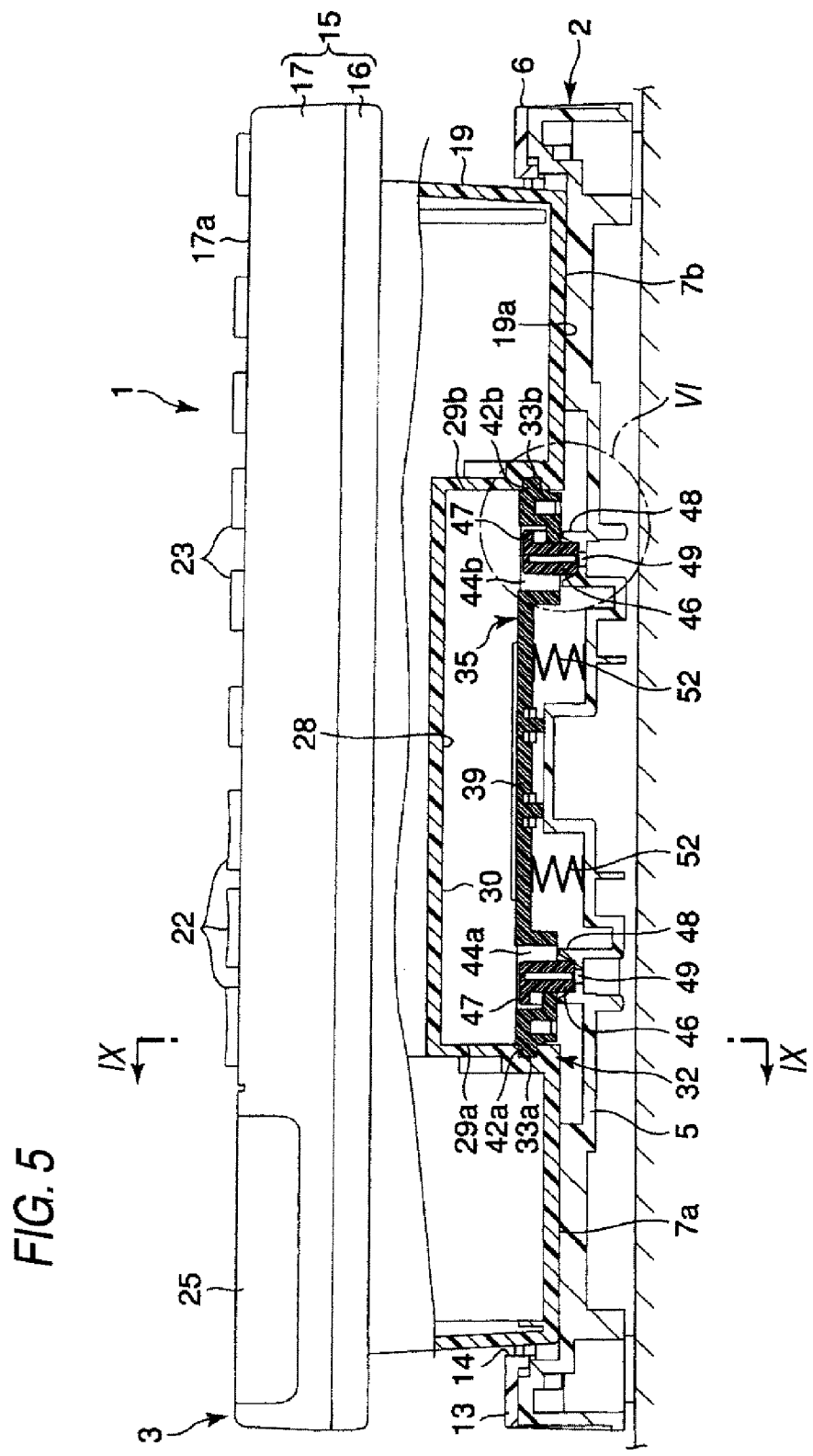
FIG. 5 is an exemplary sectional view of a telephone showing a positional relation of a base, an apparatus body, and a lock lever in the embodiment.

As shown in FIG. 5, in the leg portion 19 of the apparatus body 3, a part of the outer peripheral surface 19a thereof is inserted into the opening portion 14 of the base 2. The part of the outer peripheral surface 19a of the leg portion 19 swingably overlaps with the guide surfaces 7a and 7b of the base 2. For this reason, the apparatus body 3 is swing-displaced along the guide surfaces 7a and 7b.

As shown in FIGS. 2, 4, and 5, the leg portion 19 of the apparatus body 3 has a concave portion 28. The concave portion 28 is notched to be opened to the outer peripheral surface 19a of the leg portion 19. The concave portion 28 is formed at the center portion along the lengthwise direction of the leg portion 19. The standing portion 8 of the base 2 is provided inside the concave portion 28 of the leg portion 19.

As shown in FIGS. 4 and 5, the concave portion 28 has a pair of left and right side surfaces 29a and 29b and a ceiling surface 30. The side surfaces 29a and 29b face each other in the widthwise direction of the apparatus body 3. One side surface 29a of the concave portion 19 is adjacent to one side wall 9a of the standing portion B. The other side surface 29b of the concave portion 19 is adjacent to the other side wall 9a of the standing portion 8. The ceiling surface 30 is formed between upper ends of the side surfaces 29a and 29b to face the opening portion 14 of the base 2.

Figure 9:
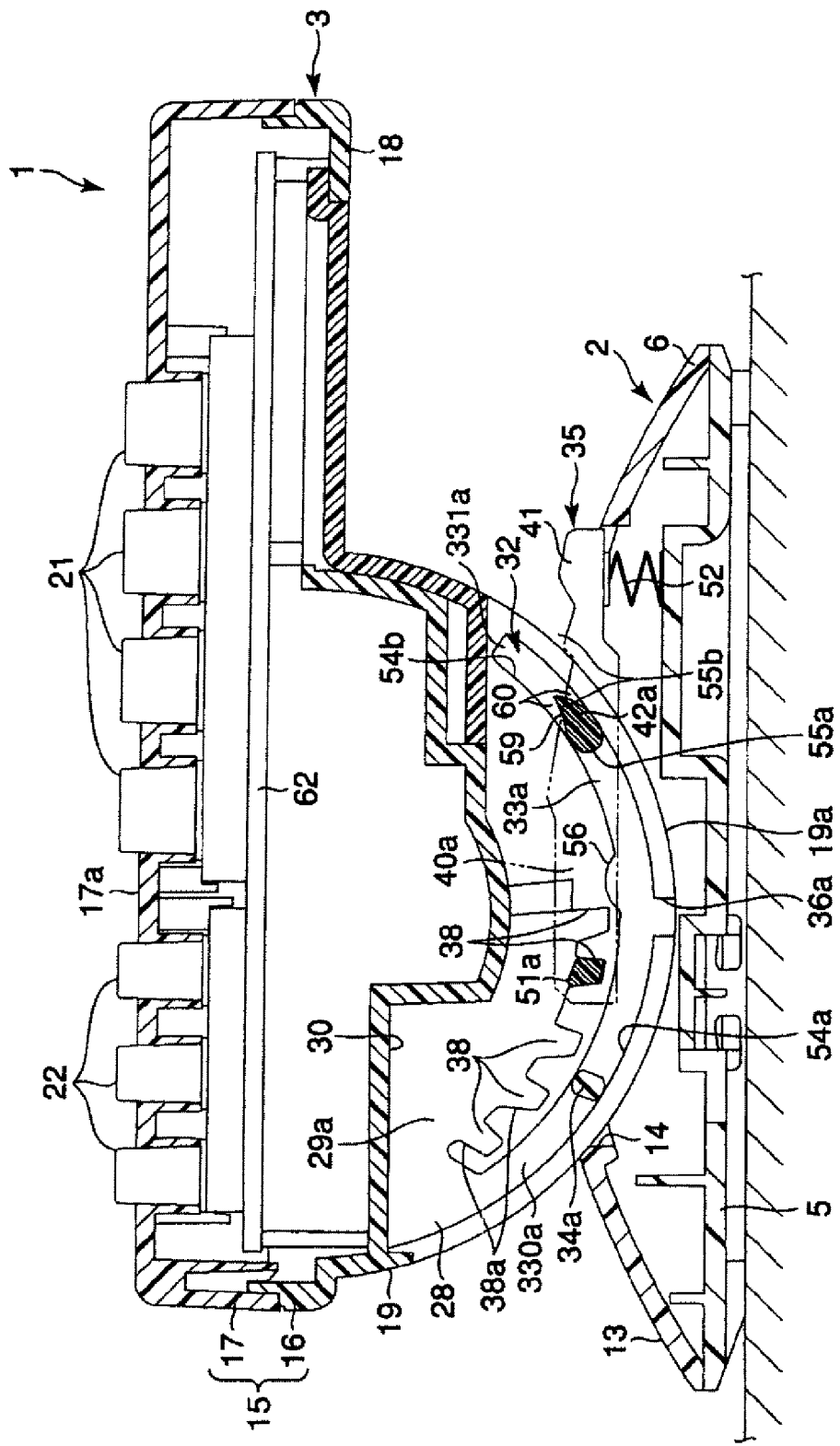
FIG. 9 is an exemplary sectional view taken along a line IX-IX of FIG. 5.
Figure 11:
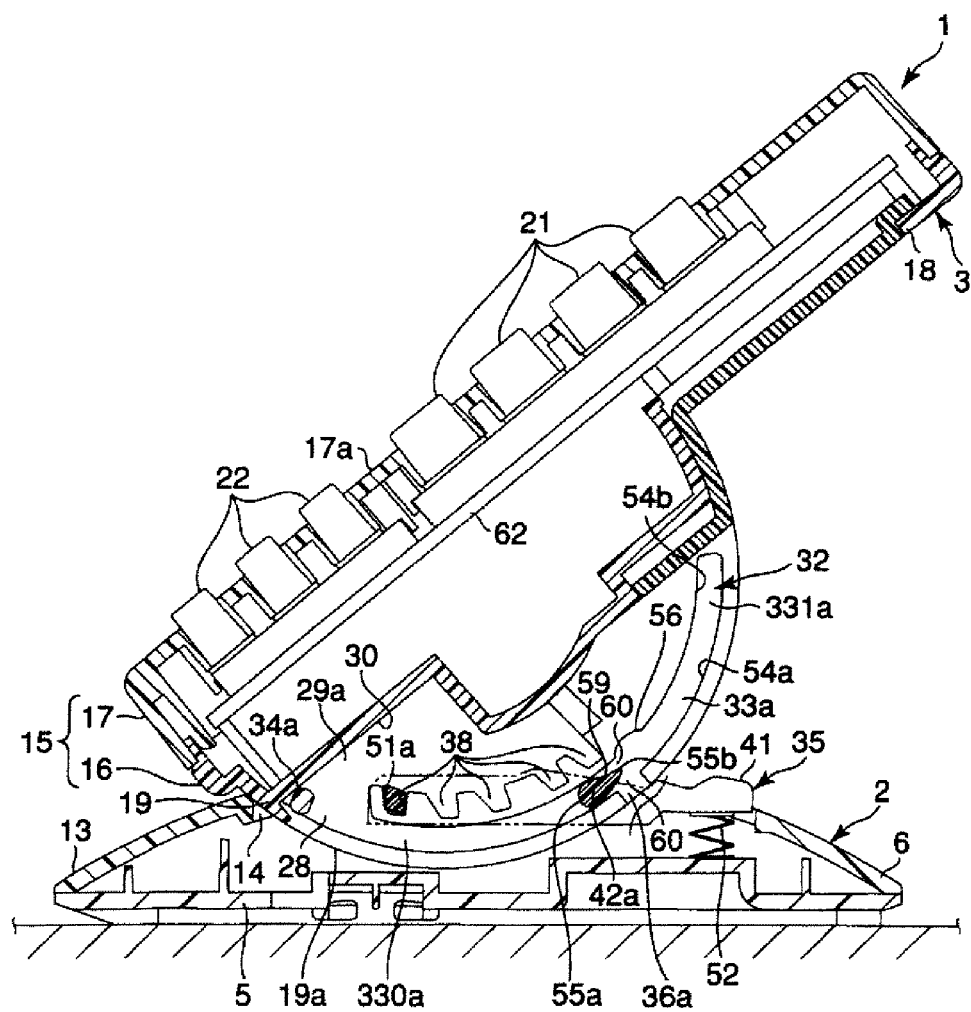
FIG. 11 is an exemplary perspective view of a telephone showing a state where an apparatus body is stood at a desired swing angle in the embodiment.

As shown in FIGS. 5, 9, and 11, the apparatus body 3 is swingably supported with the base 2 with an angle variable mechanism 32 interposed therebetween. The angle variable mechanism 32 includes a pair of guide grooves 33a and 33b, a pair of shaft portions 34a and 34b, and a lock lever 35.

The guide grooves 33a and 33b are formed on the side surfaces 29a and 29b of the concave portion 28, respectively, and exposed into the concave portion 28. The guide grooves 33a and 33b are curved in a circular arc shape along the guide surfaces 7a and 7b of the base. The guide grooves 33a and 33b have first groove end portions 330a and 330b and second groove end portions 331a and 331b, respectively. The first groove end portions 330a and 330b are located at a front portion of the apparatus body 3. The second groove end portions 331a and 331b are located at a rear portion of the apparatus body 3.

Notches 36a and 36b are formed at corner portions defined by the outer peripheral surface 19a of the leg portion 19 and the side surfaces 29a and 29b of the concave portion 28, respectively. The notches 36a and 36b are formed at a top portion of the outer peripheral surface 19a of the leg portion 19, and connect the outer peripheral surface 19a and the guide grooves 33a and 33b to each other. In other words, the notch 36a is located at a center between the first groove end portion 330a and the second groove end portion 331a of the guide groove 33a.

As shown in FIG. 3, the shaft portions 34a and 34b protrude parallel from the side walls 9a and 9b of the standing portion 8 of the base 2 toward the side surfaces 29a and 29b of the concave portion 28, and are coaxially arranged. The shaft portions 34a and 34b are guided to the guide grooves 33a and 33b through the notches 36a and 36b, and are slidably fitted to the guide grooves 33a and 33b. Accordingly, the apparatus body 3 is swingable along the guide grooves 33a and 33b.

As shown in FIGS. 4 and 9, five engagement portions 38 are formed on each of the side surfaces 29a and 29b of the concave portion 28. The engagement portions 38 are located between the first groove end portions 330a and 330b of the guide grooves 33a and 33b and the notches 36a and 36b and at the upper portion of the guide grooves 33a and 33b.

The engagement portions 38 are formed of notches opened toward the upper portions of the guide grooves 33a and 33b. The engagement portions 38 are arranged at a pitch of 10 degrees in the lengthwise direction of the guide grooves 33a and 33b, so that the swing angle of the apparatus body 3 is adjusted, for example, with an interval of 10 degree in five steps.

According to the embodiment, a front edge 38a located close to the first groove end portions 330a and 330b of the guide grooves 33a and 33b is inclined in a direction of the first groove end portions 330a and 330b of the guide grooves 33a and 33b as it goes in a direction from the bottom of the engagement portion 38 to the opening end thereof.

The lock lever 35 is an example of a lock member keeping the apparatus body 3 at a desired swing angle. As shown in FIG. 2, the lock lever 35 is housed in the opening portion 14 of the base 2, and is located between the side surfaces 29a and 29b of the concave portion 28.

Figure 8:
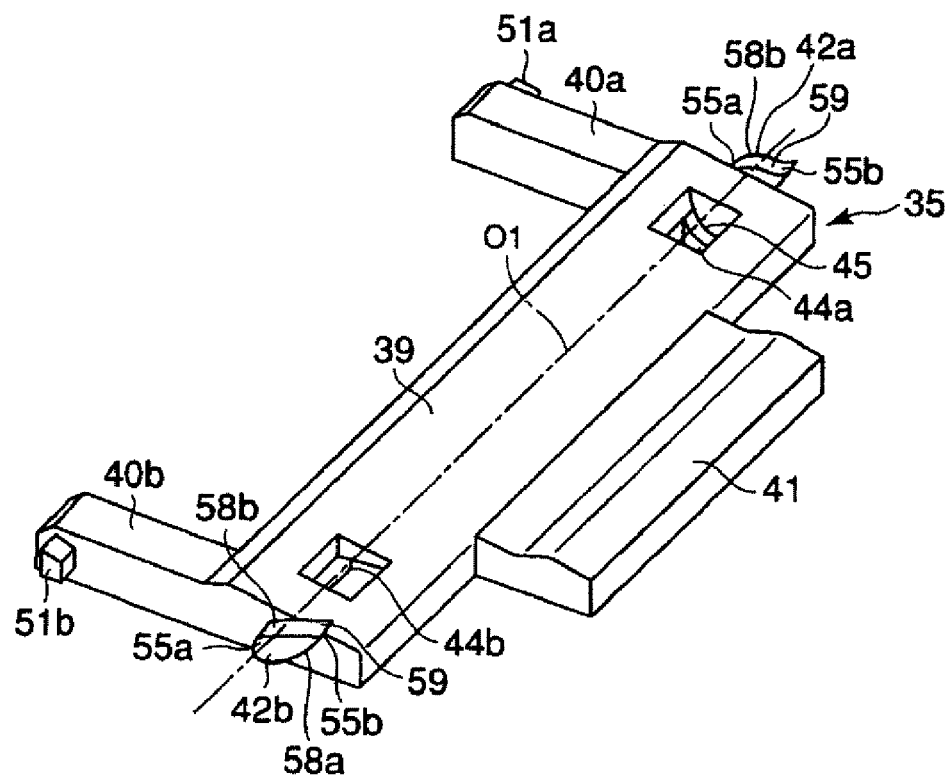
FIG. 8 is an exemplary perspective view showing a lock lever holding an apparatus body at a desired swing angle in the embodiment.

As shown in FIG. 8, the lock lever 35 has a base portion 39 and a pair of arm portions 40a and 40b. The base portion 39 has a slim plate shape between the side surfaces 29a and 29b of the concave portion 28, and is located at the rear end portion of the opening portion 14. The base portion 39 has a push button 41 to be pressed by a hand of an operator using the telephone 1. The push button 41 protrudes from the base portion 39 toward the rear of the opening portion 14, and is exposed to the upper surface of the top cover 6 of the base 2.

The base portion 39 has a pair of convex portions 42a and 42b. One convex portion 42a protrudes from one end of the base portion 39 along the lengthwise direction toward the side surface 29a of the concave portion 28. The other convex portion 42b protrudes from the other end of the base portion 39 along the lengthwise direction toward the side surface 29b of the concave portion 28. The convex portions 42a and 42b are located on the same line O1 along the lengthwise direction of the base portion 39. The convex portions 42a and 42b are guided from the notches 36a and 36b to the guide grooves 33a and 33b, and are slidably fitted to the guide grooves 33a and 33b. The convex portion 42a of the lock lever 35 and the shaft portion 34a of the base 2, and the convex portion 42b of the lock lever 35 and the shaft portion 34b of the base 2 are separated from each other in the lengthwise direction of the guide grooves 33a and 33b, respectively.

Figure 6:
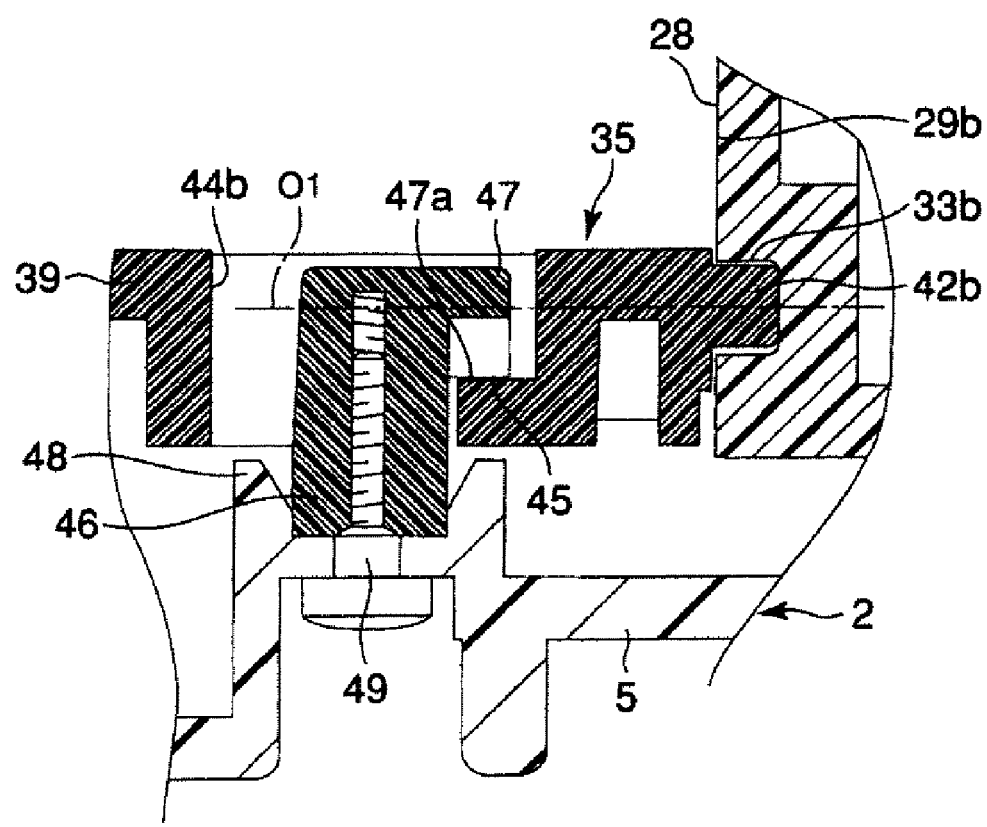
FIG. 6 is an enlarged sectional view showing a portion VI shown in FIG. 5.

As shown in FIGS. 5, 6, and 8, a pair of fitting holes 44a and 44b are formed at the base portion 39 of the lock lever 35. One fitting hole 44a is adjacent to one convex portion 42a. The other fitting hole 44b is adjacent to the other convex portion 42b. A guide surface 45 is formed inside each of the fitting holes 44a and 44b. The guide surface 45 is curved to describe a circular arc on the same axis as the line O1 passing over the convex portions 42a and 42b.

Figure 7:
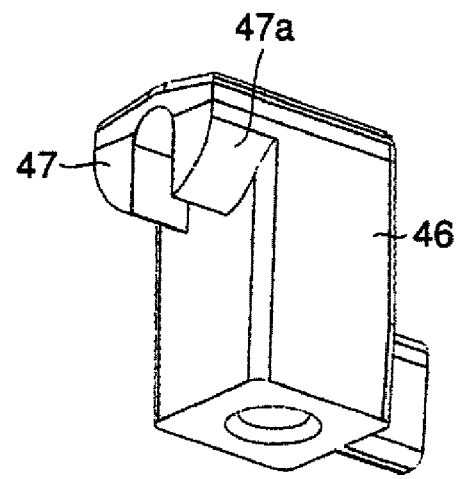
FIG. 7 is an exemplary perspective view showing a fixing piece swingably supporting a lock lever in the embodiment.

A fixing piece 46 shown in FIG. 7 is fitted into each of the fitting holes 44a and 44b. A protruding portion 47 protruding on the guide surface 45 is formed at one end of the fixing piece 46. The protruding portion 47 has an outer peripheral surface 47a facing the guide surface 45. The outer peripheral surface 47a is curved in a circular arc shape corresponding to the curvature of the guide surface 45.

As shown in FIGS. 5 and 6, a lower end of the fixing piece 46 comes into contact with an installation seat 48 formed on the bottom plate 5 of the base 2 through the fitting holes 44a and 44b. The lower end of the fixing piece 46 is fixed to the installation seat 48 by a screw 49.

Accordingly, the outer peripheral surface 47a of the fixing piece 46 slidably pressed to the guide surface 45 of the lock lever 35. Therefore, the lock lever 35 is swingably supported with the bottom plate 5 of the base 2, using the outer peripheral surface 47a of the fixing piece 46 as a guide surface. The swing center of the lock lever 35 is located on the line O1 passing over the convex portions 42a and 42b. In other words, the line O1 serves also as the swing center line of the lock lever 35.

One arm portion 40a of the lock leer 35 extends from one end of the base portion 39 toward the side opposite to the push button 41, and is adjacent to one side surface 29a of the concave portion 28. Similarly, the other arm portion 40b of the lock lever 35 extends from the other end of the base portion 39 toward the side opposite to the push button 41, and is adjacent to the other side surface 29b of the concave portion 28.

Claws 51a and 51b are formed at the front ends of the arm portion 40a and 40b, respectively. Each of the claws 51a and 51b engages selectively with any one of the engagement portions 38 of the base 2. Front surfaces of the claws 50a and 50b are inclined along the front edge 38a of the engagement portion 38.

With such a configuration, the lock lever 35 is swingably supported with the base 2 between an engagement position where each of the claws 50a and 50b engages with any one of the engagement portions 38 and a position where each of the claws 50a and 50b engages with an engagement releasing position where each of the claws 50a and 50b is released from the engagement portion 38.

A pair of compression coil springs 52 are interposed between the push button 41 of the lock lever 35 and the bottom plate 5 of the base 2. The compression coil spring 52 is an example of an elastic member, and normally urges the lock lever 35 toward the engagement position. Accordingly, each of the claws 51a and 51b of the lock lever 35 engages with any one of the engagement portions 38.

Figure 12:
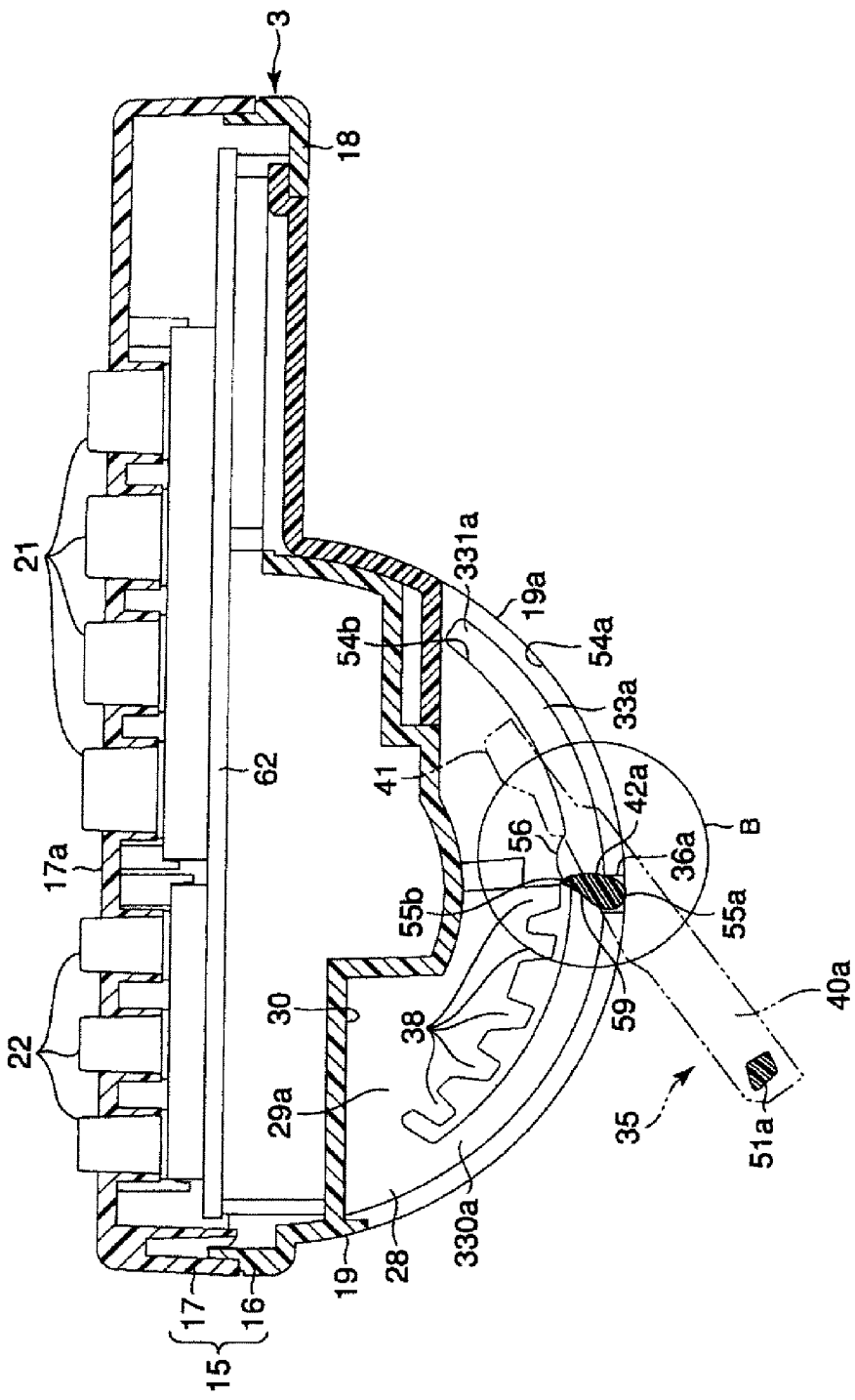
FIG. 12 is an exemplary sectional view showing a state where a convex portion of a lock lever is inserted from a notch into a guide groove in the embodiment.

As representatively showing one guide groove 33a of the apparatus body 3 in FIG. 12, the guide groove 33a has a first guide surface 54a and a second guide surface 54b. The first and second guide surfaces 54a and 54b are curved in a circular arc shape, and face each other in the widthwise direction of the guide groove 33a.

The first guide surface 54a is closer to the outer peripheral surface 19a of the leg portion 19 than the second guide surface 54b, and the notch 36a is opened to the first guide surface 54a. In the embodiment, a recessed portion 56 is formed on the second guide surface 54b. The recessed portion 56 faces the notch 36a, and is curved in a circular arc shape in a direction so as to separate from the notch 36a and the first guide surface 54a.

In the convex portions 42a and 42b of the lock lever 35 slidably fitted to the guide grooves 33a and 33b, a sectional shape in a direction orthogonal to the line O1 is a non-circular shape. Specifically, as showing one convex portion 42a in FIGS. 9 to 11, the convex portion 42a has a first end portion 55a and a second end portion 55b. The first and second end portions 55a and 55b are separated from each other in the lengthwise direction of the guide groove 33a. The first end portion 55a of the convex portion 42a is close to the first groove end portion 330a of the guide groove 33a. The second end portion 55b of the convex portion 42a is close to the second groove portion 331a of the guide groove 33a. The first end portion 55a is curved, for example, in a circular arc shape, and is slidable with respect to the first and second guide surfaces 54a and 54b. The line O1 passing over the convex portions 42a and 42b passes through the first end portion 55a of the convex portions 42a and 42b.

The convex portion 42a has first and second sliding surfaces 58a and 58b. The first sliding surface 58a is formed between the first end portion 55a and the second end portion 55b, and is curved, for example, in a circular arc shape along the first guide surface 54a of the guide groove 33a. The first sliding surface 58a is not limited to the circular arc shape, and a plurality of lines may be combined along the first guide surface 54a.

The second sliding surface 58b extends from the first end portion 55a toward the second end portion 55b, and is curved, for example, in a circular arc shape along the second guide surface 54b of the guide groove 33a. An inclined surface 59 is formed between the second sliding surface 58b and the second end portion 55b. The inclined surface 59 is inclined in a direction getting close to the first sliding surface 58a as it goes in a direction from the second sliding surface 58b to the second end portion 55b.

For this reason, the convex portion 42a has a shape tapered in a direction from the first end portion 55a to the second end portion 55b, and the second end portion 55b is formed thinner than the first end portion 55a.

Figure 13:
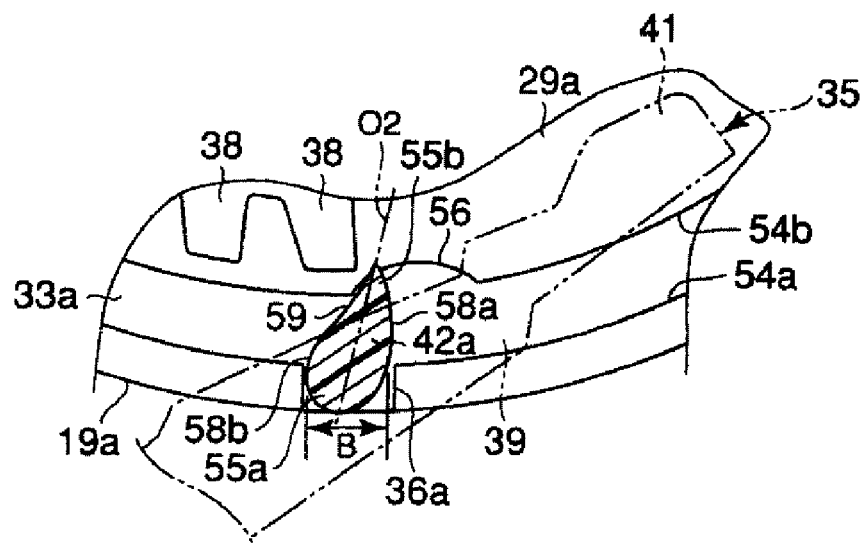
FIG. 13 is an enlarged sectional view showing a portion B shown in FIG. 12.
Figure 14:
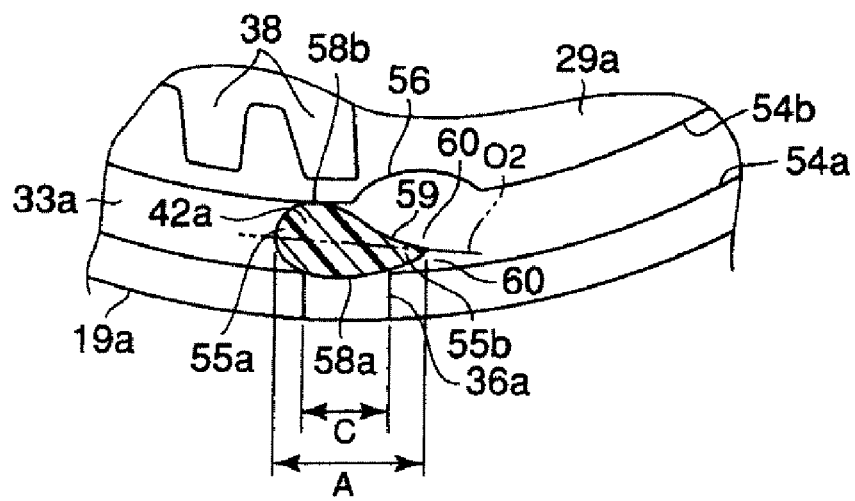
FIG. 14 is an exemplary sectional view showing a state where a convex portion of a lock lever is slidably fitted to a guide groove in the embodiment.

As shown in FIGS. 13 and 14, assuming that a total length from the first end portion 55a to the second end portion 55b of the convex portion 42a is A, a maximum width of the convex portion 42a in a direction orthogonal to a line O2 connecting the first end portion 55a and the second end portion 55b is B, and an opening width of the notch 36a is C, the A, B, and C satisfy the following relation.

$$A > C > B$$

Accordingly, the total length A of the convex portion 42a is larger than the opening width C of the notch 36a, and the first and second end portions 55a and 55b of the convex portion 42a has a size capable of being inserted into the guide groove 33a through the notch 36a.

To slidably fit the convex portion 42a to the guide groove 33a, first of all, the second end portion 55b of the convex portion 42a is inserted from the notch 36a into the guide groove 33a (see FIG. 12). Accordingly, the second end portion 55b of the convex portion 42a is inserted into the recessed portion 56 formed on the second guide surface 54b, and the first end portion 55a of the convex portion 42a is inserted into the notch 36a.

In this state, the lock lever 35 and the apparatus body 3 are swung relatively so that the line O2 connecting the first end portion 55a and the second end portion 55b of the convex portion 42a is along the guide groove 33a. Accordingly, the convex portion 42a is slidably fitted to the guide groove 33a.

Figure 10:
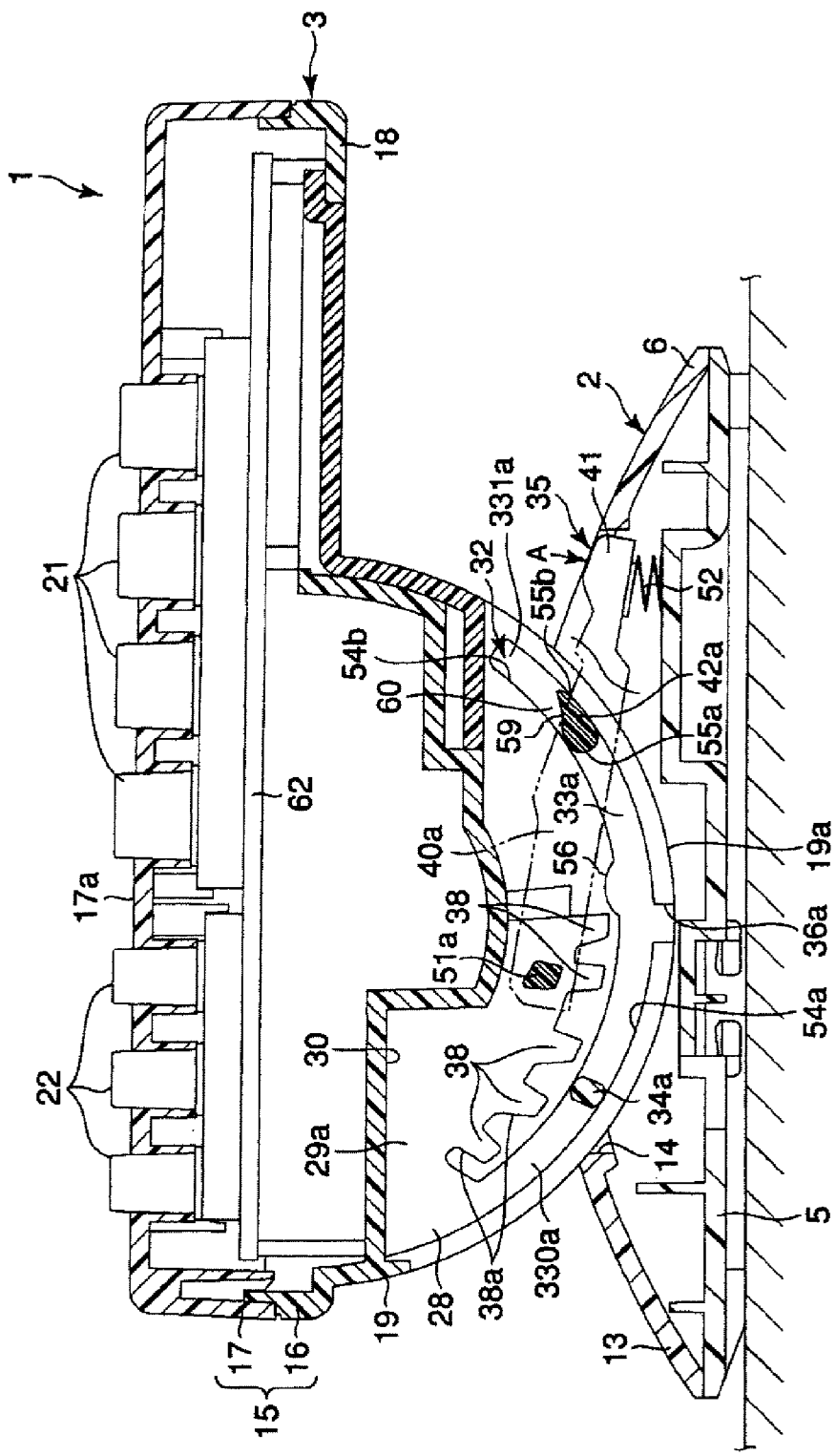
FIG. 10 is an exemplary sectional view of a telephone showing a state where an apparatus body is unlocked in the embodiment.

As shown in FIGS. 9 to 11, in the state where the convex portion 42a is fitted to the guide groove 33a, gaps 60 are formed between the inclined surface 59 of the convex portion 42a and the second guide surface 54b of the guide groove 33a and between the second end portion 55b of the convex portion 42a and the first guide surface 54a of the guide groove 33a, respectively. Due to the gaps 60, the lock lever 35 is swingable between an engagement position where each of the claws 51a and 51b engages with any one of the engagement portions 38 and an engagement releasing position where it is released from the engagement portion 38.

Figure 16:
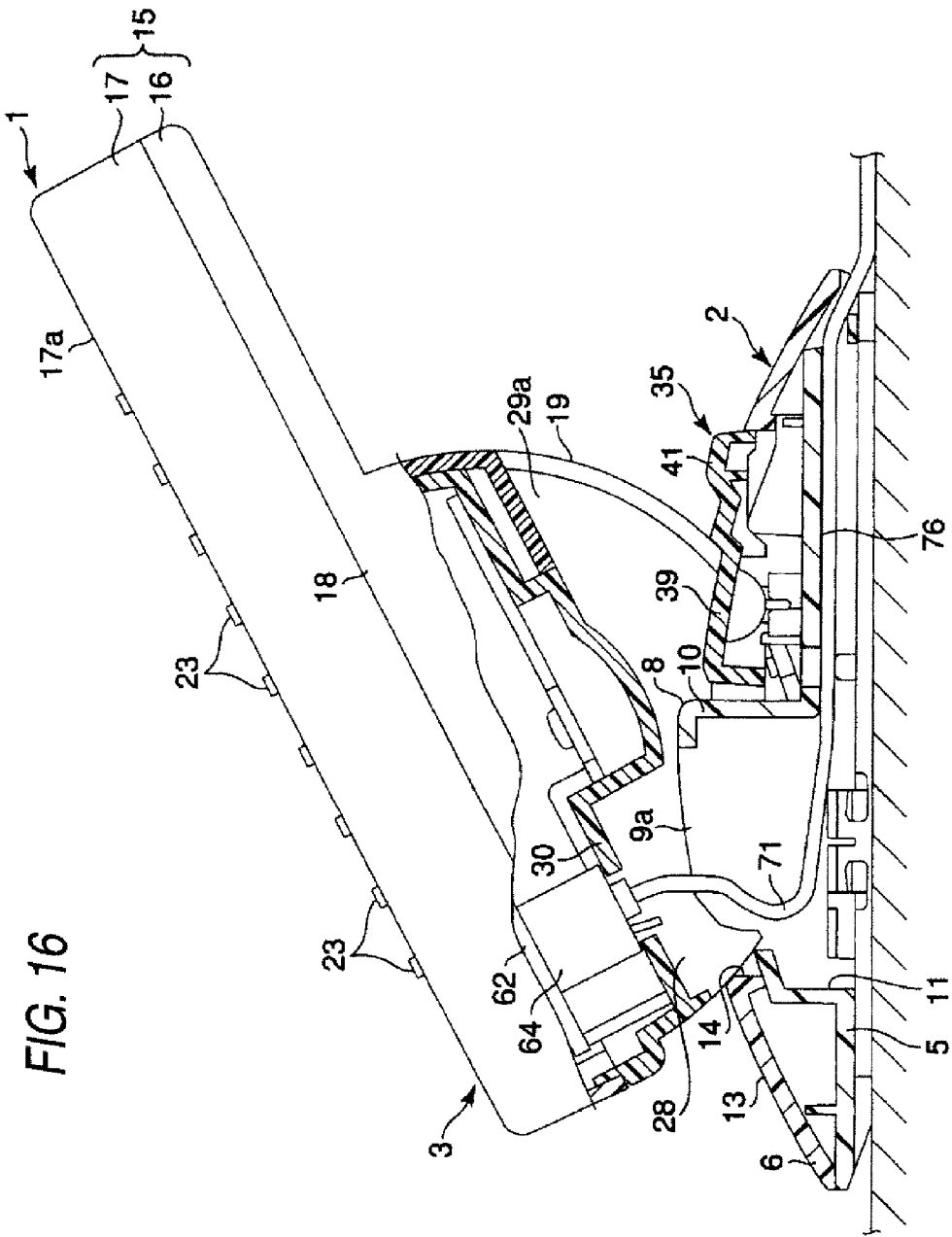
FIG. 16 is an exemplary sectional view of a telephone showing a wiring path of a cable with respect to a base in the embodiment.

As shown in FIGS. 9 and 16, a printed circuit board 62 is housed in the case 15 of the apparatus body 3. The printed circuit board 62 is disposed parallel to the upper surface 17a of the top cover 17. First to fifth modular connectors 63, 64, 65, 66, and 67 are mounted on a lower surface of a front end portion of the printed circuit board 62. The first to fifth modular connectors 63, 64, 65, 66, and 67 are arranged in one line in the widthwise direction of the apparatus body 3, and are exposed to the ceiling surface 30 of the concave portion 28.

Figure 15:
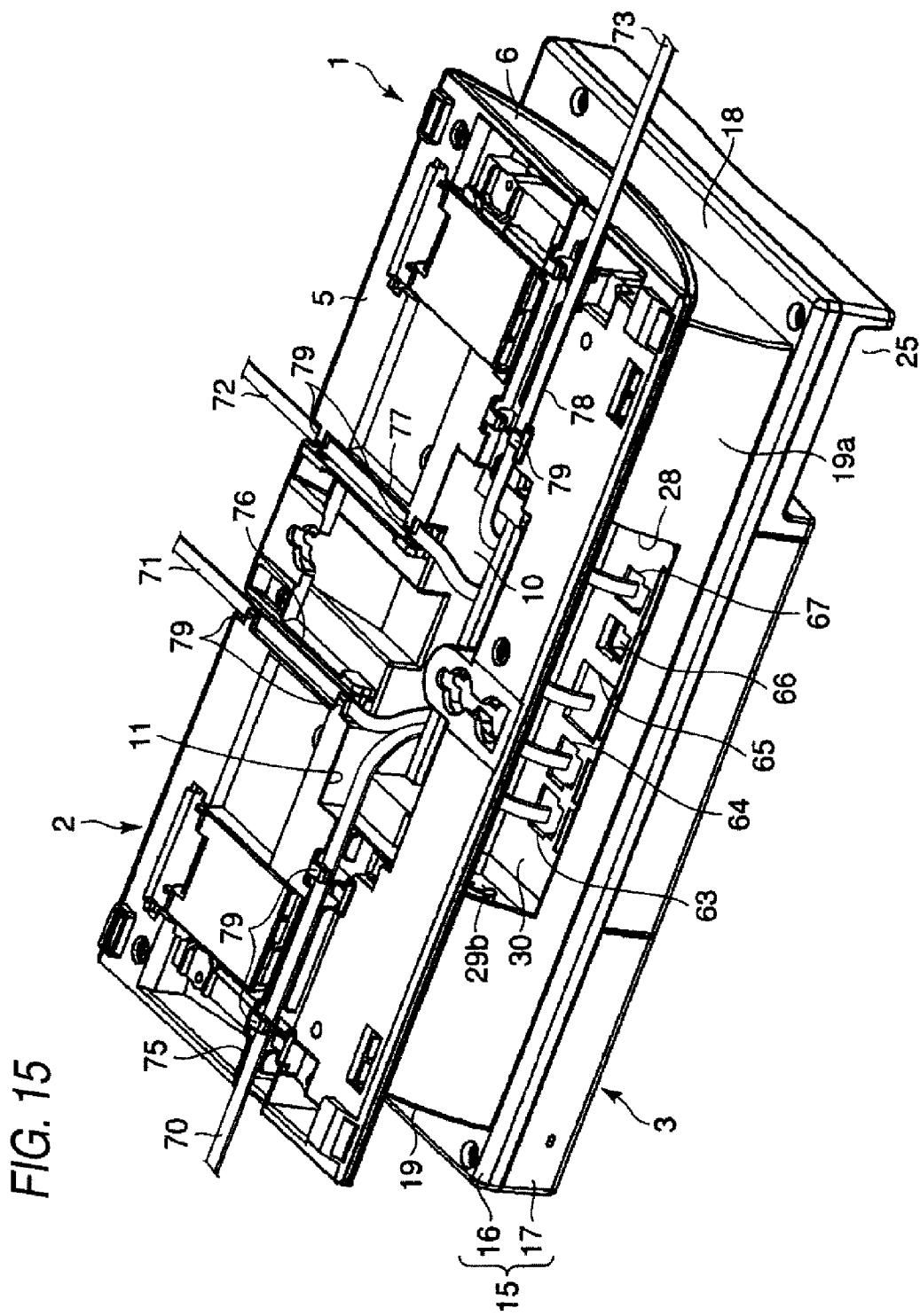
FIG. 15 is an exemplary perspective view of a telephone showing a wiring path of a cable with respect to a base in the embodiment.

The first modular connector 63 is to connect an add-on module connection cable 70. The second modular connector 64 is to connect a telephone line connection cable 71. The third modular connector 65 is to connect an external speaker connection cable 72. The fourth modular connector 66 is to connect a headset connection cable (not shown), and FIG. 15 shows a state where the headset connection cable is detached from the fourth modular connector 66. The fifth modular connector 67 is to connect a handset connection cable 73.

The cables 70, 71, 72, and 73 connected to the modular connectors 63, 64, 65, and 67 are guided from the ceiling surface 30 of the concave portion 28 to the inside of the concave portion 28, and then are drawn out through the through-hole 11 to the back surface of the bottom plate 5 of the base 2.

First to fourth wiring grooves 75, 76, 77, and 78 are formed on the back surface of the bottom plate 5 of the base 2. The first wiring groove 75 extends from the opening end of the through-hole 11 toward the right edge of the bottom plate 5. The second and third wiring grooves 76 and 77 extend from the opening end of the through-hole 11 toward the rear edge of the bottom plate 5, and are arranged parallel to one another with an interval in the widthwise direction of the base 2. The fourth wiring groove 78 extends from the opening end of the through-hole 11 toward the left edge of the bottom plate 5.

The add-on module connection cable 70 is drawn out from the through-hole 11 through the first wiring groove 75 to the right side of the base 2. The telephone line connection cable 71 is drawn out from the through-hole 11 through the second wiring groove 76 to the rear portion of the base 2. Similarly, the external speaker connection cable 72 is drawn out from the through-hole 11 through the third wiring groove 77 to the rear portion of the base 2. The handset connection cable 73 is drawn out through the fourth wiring groove 78 to the left side of the base 2, and then is guided to the handset 4.

According to the embodiment, a plurality of clamps 79 are formed at the opening edges of the first to fourth wiring grooves 75 to 78, respectively. The clamps 79 hold the cables 70 to 73 in the first to fourth wiring grooves 75 to 78, respectively.

In the telephone 1 with such a configuration, the steps of varying the swing angle of the apparatus body 3 will be described.

FIG. 9 shows a state where the apparatus body 3 is horizontal, that is, a state where the swing angle of the apparatus body 3 with respect to the base 2 is 0 degree. When the apparatus body 3 is horizontal, the claw 51a of the lock lever 35 engages with the second engagement portion 38 of the five engagement portions 38 formed on the side surface 29a of the concave portion 28.

When the apparatus body 3 is horizontal, the shaft portion 34a of the base 2 deviates from the notch 36a in the direction of the first groove end portion 330a of the guide groove 33a and the convex portion 42a of the lock lever 35 deviates from the notch 36a in the direction of the second groove portion 331a of the guide groove 33a.

As a result, the notch 36a is located at a center between the shaft portion 34a fitted to the guide groove 33a and the convex portion 42a. Accordingly, the notch 36a is separated from both of the shaft portion 34a and the convex portion 42a.

To change the swing angle of the apparatus body 3, first, the push button 41 of the lock lever 35 is pressed down in a direction indicated by an arrow A shown in FIG. 10 by a finger. Thus, the lock lever 35 is swung about the convex portion 42a from the engagement position toward the engagement releasing position in a clockwise direction in FIG. 10, and the claw 51a of the lock lever 35 is released from the second engagement portion 38.

As a result, the fixed angle of the apparatus body 3 is released, and thus the apparatus body 3 can be freely swung along the guide groove 33a as long as the push button 41 of the lock lever 35 is pressed down.

When the apparatus body 3 is swung, for example, upward by 40 degrees from the horizontal position while pressing the lock lever 35 down and then the pressing of the lock lever 35 is released, the lock lever 35 is swung from the engagement releasing position to the engagement position by the urging force of the compression coil spring 52. Accordingly, as shown in FIG. 11, the claw 51a of the lock lever 35 elastically engages with the fifth engagement portion 38. As a result, the apparatus body 3 is kept at an angle upward by 40 degrees from the horizontal position, and thus the upper surface 17a of the top cover 17 faces the operator using the telephone 1.

As shown in FIG. 11, in the state where the apparatus body 3 stands up, the convex portion 42a of the lock lever 35 is located to right cross the notch 36. Since the total length A of the convex portion 42a is larger than the opening width C of the notch 36a, the first end portion 55a of the convex portion 42a comes into contact with the first sliding surface 58a of the guide groove 33a even when the second end portion 55b of the convex portion 42a is located above the notch 36a.

The positional relation among the shaft portion 34a, the notch 36a, the guide groove 33a, and the convex portion 42a at the time of swing the apparatus body 3 is as described above, and it is natural that the positional relation among the shaft portion 34b, the notch 36b, the guide groove 33b, and the convex portion 42b at the time of swing the apparatus body 3 is the same.

According to the aforementioned telephone 1, the convex portions 42a and 42b of the lock lever 35 slidably fitted to the guide grooves 33a and 33b have a non-circular shape, and the total length A of the convex portions 42a and 42b from the first end portion 55a to the second end portion 55b of the convex portions 42a and 42b is formed larger than the opening width C of the notches 36a and 36b.

For this reason, even when the convex portions 42a and 42b reach the parts of the notches 36a and 36b reach the portions of the notches 36a and 36b opened to the guide grooves 33a and 33b by the swing the apparatus body 3, the convex portions 42a and 42b are not detached from the guide grooves 33a and 33b through the notches 36a and 36b.

In other words, after the convex portions 42a and 42b are once fitted to the guide grooves 33a and 33b, the convex portions 42a and 42b cannot be detached from the guide grooves 33a and 33b as long as the lock lever 35 and the apparatus body 3 are not relatively swung so that the line 02 connecting the convex portions 42a and 42b crosses the length direction of the guide groove 33a and 33b, as shown in FIG. 13.

Accordingly, for example, even when the telephone 1 inadvertently falls down to receive a large impact, the convex portions 42a and 42b of the lock lever 35 are prevented from being detached from the guide grooves 33a and 33b through the notches 36a and 36b.

When the apparatus body 3 is swung in the standing direction, the shaft portions 34a and 34b of the base 2 get farthest from the notches 36a and 36b. When the apparatus body 3 is laid horizontally, the notches 36a and 36b are located at the center between the shaft portions 34a and 34b and the convex portions 42a and 42b and thus it is possible to sufficiently secure distances from the notches 36a and 36b to the shaft portions 34a and 34b.

For this reason, even when the telephone 1 receives a large impact, it is possible to prevent the shaft portions 34a and 34b of the base 2 from being detached from the guide grooves 33a and 33b through the notches 36a and 36b.

Accordingly, it is possible to keep the connection of the base 2, the apparatus body 3, and the lock lever 35, and thus there is an advantage that a troublesome recovery work is unnecessary.

A desktop apparatus having the angle variable mechanism according to the invention is not limited to the telephone disclosed in the above-described embodiment. For example, the desktop apparatus may be also embodied as another desktop apparatus such as a base unit of an information terminal apparatus or an interphone.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An angle variable mechanism comprising:
a fixed unit that has a pair of guide surfaces recessed in a circular arc shape and a pair of coaxial shaft portions located between the guide surfaces;
a movable unit that includes an outer peripheral surface being curved in a circular arc shape and being in slidable contact with the pair of guide surfaces, a concave portion being opened in the outer peripheral surface and having a pair of side surfaces which face each other, a pair of guide grooves formed on the pair of side surfaces respectively and curved along the outer peripheral surfaces, to slidably receive the pair of shaft portions, and a pair of notches formed at respective edges between the pair of outer peripheral surfaces and the pair of side surfaces to guide the pair of shaft portions into the pair of guide grooves; and
a lock member that is swingably supported with the fixed unit and interposed between the pair of side surfaces to regulate a swing angle of the movable unit with respect to the fixed unit,
wherein the lock member has a pair of convex portions located on a swing center axis of the lock member,
wherein the pair of convex portions are slidably fitted to the pair of guide grooves through the pair of notches respectively,
wherein each of the convex portions has a first end portion and a second end portion separated from each other in a lengthwise direction of the guide grooves in a state where the pair of convex portions are received in the pair of guide grooves respectively,
wherein a length of the convex portion between the first end portion and the second end portion is larger than an opening width of each of the notches in the lengthwise direction,
wherein the second end portion is formed thinner than the first end portion, so that a gap is formed between the second end portion and an inner surface of the guide groove to allow the lock member to swing.

2. The mechanism according to claim 1, wherein assuming that the length of the convex portion between the first end portion and the second end portion is A, a maximum width of the convex portion in a direction orthogonal to a line connecting the first end portion and the second end portion is B, and the opening width of the notch is C, a relation of A >C>B is satisfied.

3. The mechanism according to claim 2, wherein the guide groove has a first guide surface curved in a circular arc shape, and the convex portion includes a slide surface that is slidable along the first guide surface between the first end portion and the second end portion.

4. The mechanism according to claim 3, wherein the convex portion is guided in a direction from the second end portion to the guide groove through the notch, and the first end portion is inserted into the guide groove by relatively swinging the lock member and the movable unit when the first end portion reaches the notch.

5. The mechanism according to claim 4, wherein the guide groove includes an escaping portion formed at a position facing the notch, the guide groove recessed in a direction away from the notch.

6. The mechanism according to claim 5,
wherein each of the side surfaces includes a plurality of engagement portions arranged in the lengthwise direction of the guide groove,
the lock member has a pair of claws each engageable with any one of the plurality of engagement portions to selectively determine the swing angle of the movable unit with respect to the fixed unit.

7. The mechanism according to claim 6, wherein
the lock member has a base portion and a pair of arm portions, the base portion having a push button, the pair of arm portions protruding from the base portion into the concave portion,
the pair of convex portions are formed at the base portion, and
the pair of claws are respectively formed at the pair of arm portions.

8. The mechanism according to claim 7, wherein the pair of convex portions are slidably fitted in the pair of guide grooves at positions away from the pair of shaft portions in the lengthwise direction of the guide grooves.

9. The mechanism according to claim 8,
wherein the lock member is swingable about the convex portion between an engagement position where the claw engages with one of the engagement portions and a release position where the claw is released from the engagement portion, and the lock member is normally urged toward the engagement portion by an elastic member.

10. The mechanism according to claim 1, wherein:
the pair of convex portions are respectively guided from the notches to the guide grooves and are slidably fitted to the guide grooves at positions separated from the shaft portions of the fixed unit in a lengthwise direction of the guide grooves; and
each of the notches is located at an intermediate position between each of the shaft portions fitted in the guide groove and the convex portion when the movable unit is laid parallel to the fixed unit, and the notch shifts in a direction from the shaft portion to the convex portion when the movable unit is swung to a standing position with respect to the fixed unit.

11. The mechanism according to claim 10, wherein the guide groove has a first guide surface curved in a circular arc shape, and the convex portion includes a slide surface that is slidable along the first guide surface between the first end portion and the second end portion.

12. The mechanism according to claim 11, wherein the convex portion is guided in a direction from the second end portion to the guide groove through the notch, and the first end portion is inserted into the guide groove by relatively swinging the lock member and the movable unit when the first end portion reaches the notch.

13. The mechanism according to claim 12, wherein the guide groove includes an escaping portion formed at a position facing the notch, the guide groove recessed in a direction away from the notch.

14. The mechanism according to claim 13,
wherein each of the side surfaces includes a plurality of engagement portions arranged in the lengthwise direction of the guide groove,
the lock member has a pair of claws each engageable with any one of the plurality of engagement portions to selectively determine the swing angle of the movable unit with respect to the fixed unit.

15. A desktop apparatus comprising:
a base that has a pair of guide surfaces recessed in a circular arc shape and a pair of coaxial shaft portions located between the guide surfaces;
an apparatus body that includes an outer peripheral surface being curved in a circular arc shape and being in slidable contact with the pair of guide surfaces, a concave portion being opened in the outer peripheral surface and having a pair of side surfaces which face each other, a pair of guide grooves formed on the pair of side surfaces respectively and curved along the outer peripheral surfaces, to slidably receive the pair of shaft portions, and a pair of notches formed at respective edges between by the pair of outer peripheral surfaces and the pair of side surfaces to guide the pair of shaft portions into the pair of guide grooves; and
a lock member that is swingably supported with the base and interposed between the pair of side surfaces to regulate a swing angle of the apparatus body with respect to the base,
wherein the lock member has a pair of convex portions located on a swing center axis of the lock member,
wherein the pair of convex portions are respectively guided from the notches to the guide grooves and are slidably fitted to the guide grooves at positions separated from the shaft portions of the fixed unit in a lengthwise direction of the guide grooves,
wherein each of the convex portions has a first end portion and a second end portion separated from each other in a lengthwise direction of the guide grooves in a state where the pair of convex portions are received in the pair of guide grooves respectively,
wherein a length of the convex portion between the first end portion and the second end portion is larger than an opening width of each of the notches in the lengthwise direction,
wherein the second end portion is formed thinner than the first end portion, so that a gap is formed between the second end portion and an inner surface of the guide groove to allow the lock member to swing.

16. The apparatus according to claim 15, wherein each of the notches is located at an intermediate position between each of the shaft portions fitted in the guide groove and the convex portion when the apparatus body is laid parallel to the base,
and the notch shifts in a direction from the shaft portion to the convex portion when the apparatus body is swung to a standing position with respect to the base.

* * * * *